United States Patent [19]
Stewart

[11] Patent Number: 5,925,468
[45] Date of Patent: *Jul. 20, 1999

[54] SOLARIZATON RESISTANT AND UV BLOCKING GLASS

[75] Inventor: Ronald L. Stewart, Elmira, N.Y.

[73] Assignee: Corning Incorporated, Corning, N.Y.

[21] Appl. No.: 08/834,682

[22] Filed: Apr. 1, 1997

Related U.S. Application Data

[60] Provisional application No. 60/015,302, Apr. 12, 1996.

[51] Int. Cl.[6] .................................................... B32R 9/00
[52] U.S. Cl. ........................ 428/426; 428/428; 428/432; 359/900
[58] Field of Search .................................... 428/426, 428, 428/432; 359/900

[56] References Cited

U.S. PATENT DOCUMENTS

| | | | |
|---|---|---|---|
| 2,393,449 | 1/1946 | Armistead | 501/43 |
| 3,325,299 | 6/1967 | Araujo | 501/13 |
| 5,322,819 | 6/1994 | Araujo et al. | 501/13 |

Primary Examiner—Timothy M. Speer
Attorney, Agent, or Firm—Angela N. Nwaneri; Anca C. Gheorghiu

[57] ABSTRACT

An optical device capable of absorbing ultraviolet radiation while providing high transmission throughout the visible wavelength region. The device which combines UV blocking glass and solarization resistant glass is resistant to solarization when exposed to intense UV emissions; and at the same time, sharply cutting-off transmission at about 400 nm.

16 Claims, 6 Drawing Sheets

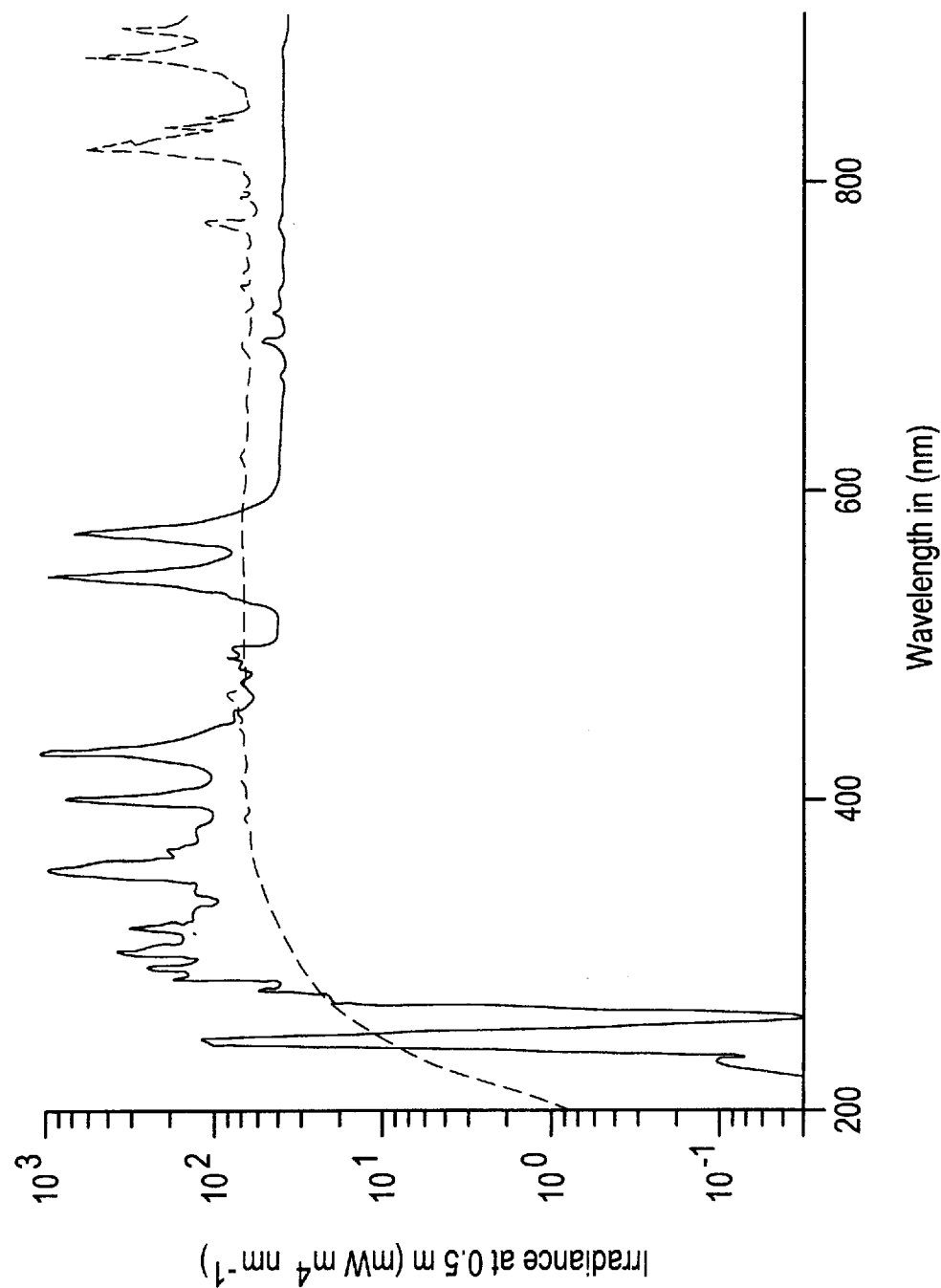

SOLARIZATON RESISTANT AND UV BLOCKING GLASS

This application claims the benefit of U.S. Provisional application No. 60/015,302 filed Apr. 12, 1996, entitled SOLARIZATION RESISTANT AND UV BLOCKING GLASS.

FIELD OF THE INVENTION

A family of glasses that strongly absorb ultraviolet radiation, which glasses are also highly resistant to solarization when exposed to intense UV emissions.

BACKGROUND OF THE INVENTION

When optical systems use high power lamp light sources, there can be a significant radiative proportion of the light emitted in the UV region. When organic materials are in the light path there will be a degradation of this material over time. This degradation effect has also been recognized for such applications as LCD projection systems, and for high power laser pump lamps.

It is well known that UV radiation can also cause degradation and discoloration in such items as paints, fabrics and plastics. Specifically, electromagnetic energy in the ultraviolet spectrum (i.e., between 4 and 400 manometers), causes paints to fade, causes rubber to crack, and plastics to crumble with time. Therefore, strong UV absorption by architectural glazing materials is beneficial.

The sun is not the only light source that emits UV. Various artificial lighting sources like Hg or Xe ARC and halogen lamps emit UV radiation. UV absorbing glasses can be used that block the entire range of the UV emission of these sources. However, as a result of this absorption, with prolonged usage these glasses tend to solarize or darken with time, especially from the absorption of the shorter wavelength, higher energy portion of the UV region. Accordingly, there is an interest in absorbing filters that show minimal loss of visible transmission.

It is also common knowledge that photochromic glasses are activated by absorption of UV radiation. The most evident utility of such glasses has been in control of visible light transmission. Inherently, however, they also strongly influence the intensity of UV transmission. This behavior is readily understood in terms of the Grotthus-Draper Law which states that: Only light that is absorbed can produce chemical change.

Photochromic glasses containing silver halide crystals absorb strongly at wavelengths shorter than 320 nm, but only weakly in the interval between 320 and 400 nm. Radiation in the wavelength range of 320–400 nm is much less harmful than that in the shorter wavelength region. Nevertheless, for some purposes, it would be desirable to eliminate transmission of this radiation as well. Therefore, it has been proposed to dope the above glasses with ions which provide additional absorption of UV radiation.

Photochromic glasses containing halides of copper and/or cadmium are also known, but not commercially available. Such glasses were originally disclosed in U.S. Pat. No. 3,325,299 (Araujo). The transmission cutoff in these glasses occurs at approximately 400 nm, and is much sharper than that in silver halide glasses. Consequently, protection against UV radiation is complete in these glasses without additional doping.

There are numerous applications for glasses having the sharp UV cutoff inherent in the copper or copper-cadmium halide glasses. Frequently, however, such applications require avoiding any change in visible absorption such as occurs in photochromic glasses exposed to UV radiation, e.g., sunlight. Therefore, it would be highly desirable to achieve the sharp UV cutoff characteristic of the copper and copper-cadmium halide glasses without the attendant photochromic behavior. It would also be highly desirable to produce such glasses that are essentially colorless because the yellow color associated with most UV absorbing materials is unacceptable for many applications. However, various fixed colors are desirable for other applications.

More recently, U.S. Pat. No. 5,322,819 herein incorporated by reference, disclosed a non-photochromic $R_2O$—$B_2O_3$—$SiO_2$ glass which contains a precipitated cuprous or cuprous-cadmium halide crystal phase, and which has a sharp spectral cutoff at about 400 nm.

Two example application of this UV absorbing glass illustrate the problem.

Some LCD (liquid crystal display), projection systems use a straight line light path from a tungsten halide, xenon short arc or metal halide lamp through polarizers and LCD image screen followed by projection lenses. The complete UV as well as the IR radiation from these lamps must be blocked or the LCD screens and polarizers will be seriously degraded. The sharp UV cut-off absorbing glass could be used to block the UV radiation; however, there is the possibility for some long term darkening in the transmitted visible range from the shorter UV wavelengths produced by the 150 to 400 watt lamps.

Another potential application could be filters for laser pump lamps. UV absorbing filters are desired to block UV light emitted by 3 to 5 kW xenon pump lamps to protect organic optical adhesives in the light path to the lasing cavity, as well as reduce degradation of mirrors in the cavity. The most efficient filters will have high transmission maintained in the visible or near IR pump wavelengths. Again good UV absorption is desired without significant solarization.

In order to use the UV cut-off glass in filtering applications where the light source emits short wavelength UV it should be possible to protect the UV cut-off glass with other more solarization resistant glasses that cut-off the shorter wavelength UV light, allowing the UV cut-off glass to absorb out to the edge of the visible (~400 nm). This would permit good transmission in the visible range. Accordingly, it is the object of the present invention to provide strong UV blocking glass articles which are also resistant to solarization when exposed to intense UV radiation.

SUMMARY OF THE INVENTION

Briefly, the invention relates to optical elements capable of absorbing throughout the ultraviolet to wavelengths of 400 nm, while providing high transmission through the visible into the near IR (2500 nm). The optical device is a combination of a UV blocking glass, and a solarization (or darkening) resistant glass.

BRIEF DESCRIPTION OF THE DRAWINGS

FIG. 6 is a spectral irradiance of a 350 watt Hg(Xe)-ARC lamp.

DETAILED DESCRIPTION OF THE INVENTION

Figure 1:
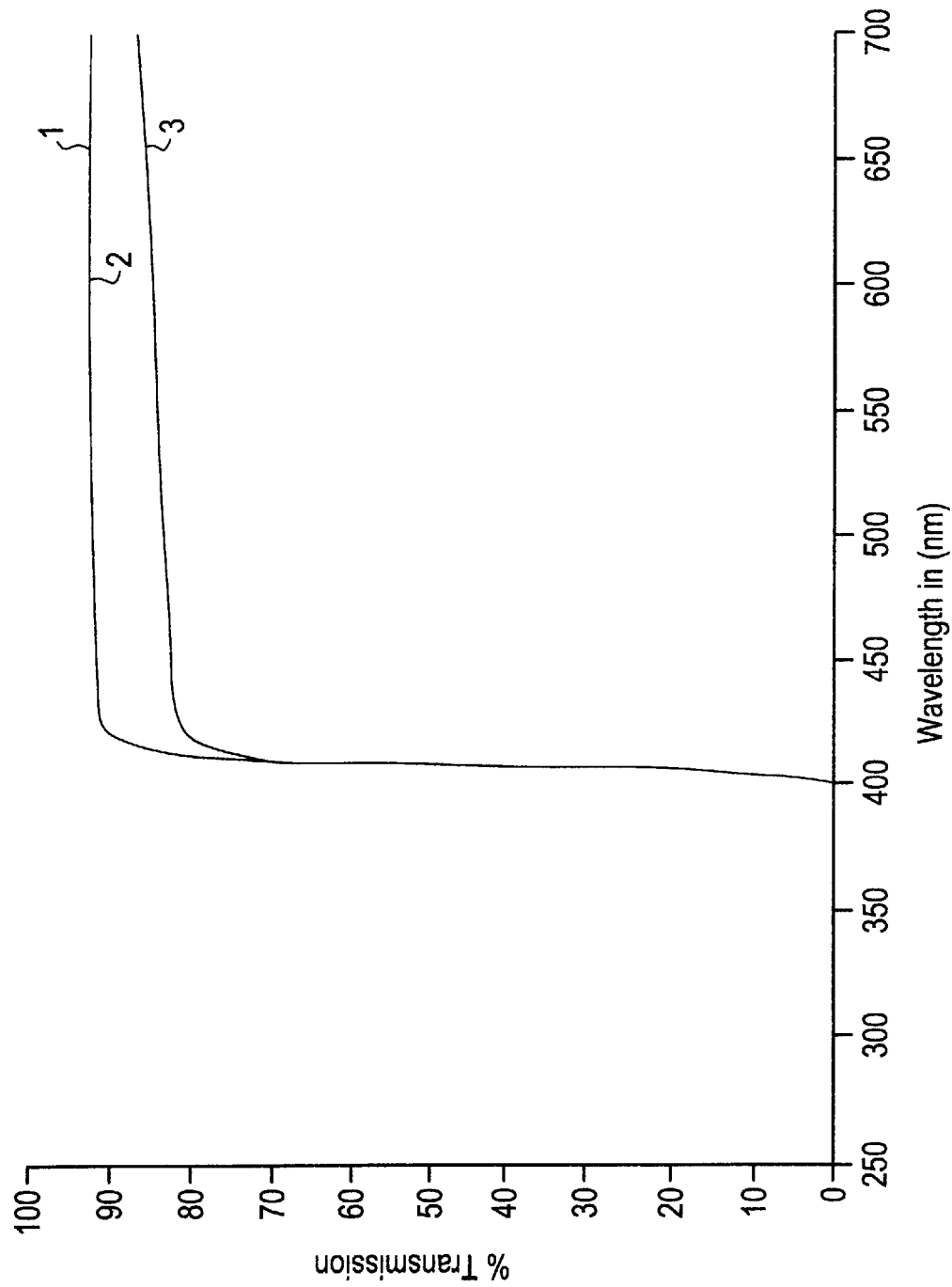
FIG. 1 is a spectral transmission graph comparing the darkening or solarization of (1) an unexposed UV blocking glass, (2) UV absorbing glass exposed to sunlight, and (3) a UV absorbing glass when exposed for 10 days to a 325 watt Hg-ARC lamp, which lamp is enveloped in fused silica.

Although the sharp UV cut-off glasses such as disclosed in U.S. Pat. No. 5,322,819 can block (i.e., absorb), UV light throughout the UV spectral region, such glasses have been found to sometimes darken in the visible and near IR when exposed to intense UV light emitted by 2 arc lamp light sources. FIG. 1 shows the darkening experienced by a prior art UV cut-off glass, when it was exposed for 10 days to a 325 watt Hg-ARC lamp with a fused silica envelope. Exposure to a 1000 watt Hg(Xe)-ARC lamp for 10 days has also been shown to reduce the transmission of this glass by 6% to 86.4% at 500 nm.

As shown in FIG. 1 exposure to solar radiation modified by the atmosphere does not reduce the transmission of the sharp UV cut-off glass. The atmosphere does not pass wavelengths below about 300 nm. Continuous exposure to natural sunlight for 11 months has not shown any solarization. Accelerated solar simulation testing (higher actinic power over a longer wavelength range) done in an Atlas CIE35 weatherometer with some of the radiated energy from 280 to 300 nm also, did not reduce the glass transmission over 8 days of testing.

Useful solarization resistant masking glasses for the invention include any glass capable of blocking wavelengths less than about 200 nm, preferably, less than 260 nm, and more preferably less than about 300 nm. One example of useful solarization or darkening resistant glasses include the barium-aluminum-boron-silicate glasses such as disclosed in U.S. Pat. No. 2,393,449, having the general composition of 0–55% $SiO_2$, 10–30% BaO, 5–20% $Al_2O_3$, 22–80% $B_2O_3$, and optionally, a small amount of fluorine. Another useful solarization resistant glass is that disclosed in U.S. Pat. No. 1,304,623, having the general composition of at least 70% $SiO_2$, 0–3% $Al_2O_3$, and a ratio of $B_2O_3$:$Na_2O$ of at least 2:1.

EXAMPLES

1. Solarization Protected Sharp UV Cut-off

Exposure experiments with the 1000 watt Hg(Xe) lamp were done with the solarization resistant glasses used to block the short wavelength UV light. In this experiment, several squares of various glasses were placed on top of a sharp UV cut-off glass, referred to herein as glass Code M. Also a square portion of the Code M glass was left uncovered while another square was blocked with an opaque absorber. The glasses used to envelope or cover the sharp UV cut-off glass (Code M) in the experiments were Codes A, B, C and D. The compositions of the various glass codes are given below in weight percent.

|  | M | A | B | C | D |
|---|---|---|---|---|---|
| $SiO_2$ | 60 | 80.0 | 50.0 | 64.3 | 61.4 |
| $B_2O_3$ | 17 | 13.8 | 15.0 | 9.0 | 9.30 |
| $Al_2O_3$ | 11 | 1.9 | 10.0 | 2.0 | 2.25 |
| $Li_2O$ | 2 |  |  |  |  |
| $Na_2O$ | 9 | 4.3 |  | 6.5 | 7.15 |
| $K_2O$ | 1.5 |  |  | 7.6 | 6.65 |
| CaO |  |  |  |  |  |
| BaO |  |  | 25.0 |  |  |
| SrO |  |  |  |  |  |
| CuO | 0.6 |  |  |  |  |
| CdO |  |  |  |  |  |
| ZnO |  |  |  | 7.0 | 7.0 |
| $SnO_2$ | 0.7 |  |  |  |  |
| $As_2O_3$ |  |  | 1 |  |  |
| $TiO_2$ |  |  |  | 3.4 | 1.0 |
| $Sb_2O_3$ |  |  |  |  | 0.25 |
| $CeO_2$ |  |  |  | 0.3 | 5.0 |
| Cl | 0.1 |  |  |  |  |
| Br | 0.7 |  |  |  |  |
| F |  |  |  |  |  |

The thicknesses of glass Samples A, B, C and D were 1.8, 1.1, 0.54, and 0.45 mm respectively. The glass used for Sample C was only available in thins sheets measuring 0.18 mm each. Three of the thin sheets were stacked to obtain Sample C. The 1000 watt Hg(Xe)-ARC lamp was again run for 10 days of exposure.

A sheet of glass Sample M, measuring 3 inches×4 inches was masked with glass samples A, B, C, D and an opaque mask as shown below:

| A | Opaque Mask | B |
|---|---|---|
| C | No Mask | D |

The masked glass (M), was then exposed to a 1000 watt mercury xenon Oriel exposure unit for 240 hours (equivalent to 2400 hours in bright sunlight.)

The Code M glass was evaluated square by square for its transmission at 500 nm and its 50% transmission cut-off wavelength. These were compared to the values before exposure. Also the protective glass pieces were tested before and after exposure for transmission at 500 nm and their 50% transmission wavelengths. The results are summarized in the following tables.

|  | A | B | C | D | Opaque | No Mask |
|---|---|---|---|---|---|---|
|  | % Transmission at 500 nm | | | | | |
| Before Exposure | 93.1 | 91.6 | 78.8 | 88.3 | 92.7 | 92.7 |
| After Exposure | 93.3 | 91.9 | 78.2 | 87.6 | 92.5 | 86.4 |
| % Transmission of Glass M after Exposure | 92.2 | 92.4 | 92.4 | 92.3 |  |  |
| % Transmission of Glass M plus Glass Mask | 83.1 | 84.7 |  | 81.7 |  |  |
|  | 50% Cut-off Wavelength | | | | | |
| Before Exposure | 305.8 | 311.5 | 323.7 | 378.0 | 405.7 |  |
| After Exposure | 315.2 | 313.9 | 323.6 | 380.6 | 406.7 | 407.0 |
| 50% cut-off of Glass M after Exposure | 407.6 | 405.5 | 407.6 | 405.5 |  |  |

The results show that all the glasses completely protected the Code M glass from solarization due to this exposure, while the unmasked part of the glass lost 6% transmission at 500 nm. Even the Code B glass which has the shortest wavelength cut-off (~260 nm) was found to protect the Code M glass from darkening. Code A also was found to protect from any darkening from the Hg-ARC lamp for 10 days. There was also no significant change in the 50% transmission cut-off wavelength for the Code M glass where it was protected by the opaque square or by the other glasses.

Figure 2:
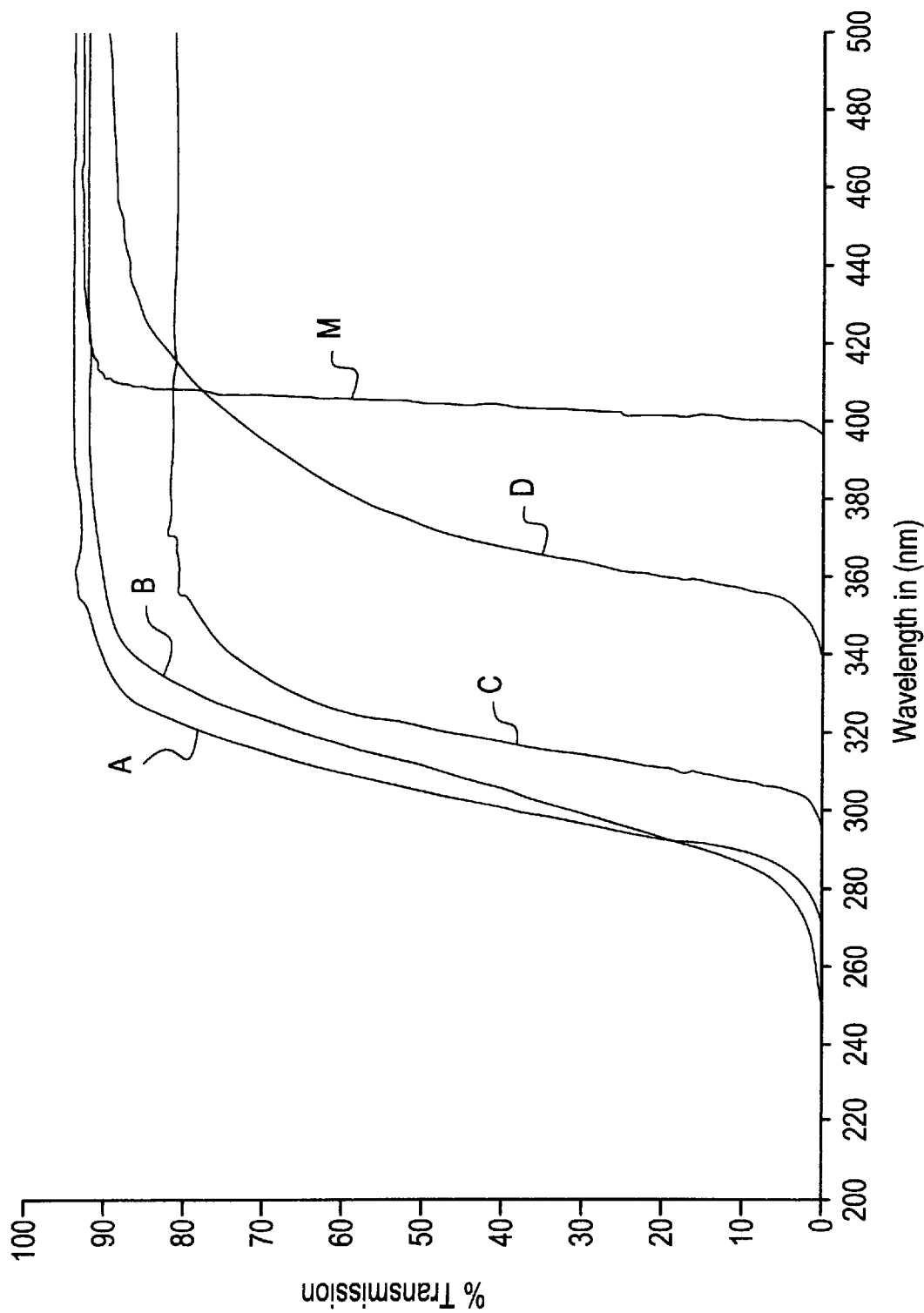
FIG. 2 is a graph showing the spectral transmissions of several solarization resistant glasses with respect to the transmission curve of a UV absorbing glass.

As shown in FIG. 2, these masking glasses begin total absorption of UV light by ~270, ~260, ~298 and ~340 nm for the Codes A, B, C and D respectively. The only significant effect seen for the protecting glasses from this exposure was that the 50% transmission cut-off wavelength for Code A glass was shifted from 306 to 315 nm. All the transmission values for all the glasses at 500 nm were unchanged from the exposure.

2. Additional Exposure/Glass Masking Experiments

Additional exposure experiments were performed with the 1000 watt Hg(Xe)-ARC lamp with other glass mask materials. The glasses were a soda-lime float glass, a glass (Code E), a high silica glass Code F, a fused silica (Code G), as well as a very thin piece of Code C measuring about 0.18 mm in thickness (Code C'). The thicknesses of the E, F and G glasses were 3, 1.5, and 2 mm respectively. The composition of glass Codes E, F and G are given below:

|  | E | F | G |
|---|---|---|---|
| $SiO_2$ | 61 | 96.5 | 100 |
| $B_2O_3$ | 9 | 3 |  |
| $Al_2O_3$ | 2 | 0.5 |  |
| $Li_2O$ |  |  |  |
| $Na_2O$ | 7 |  |  |
| $K_2O$ | 7 |  |  |
| CaO |  |  |  |
| BaO |  |  |  |
| SrO |  |  |  |
| $Cu_2O$ |  |  |  |
| CdO |  |  |  |
| ZnO | 7 |  |  |
| $SnO_2$ |  |  |  |
| $As_2O_3$ |  |  |  |
| $Sb_2O_3$ |  | 0.2 |  |
| $CeO_2$ |  | 5 |  |
| $TiO_2$ |  | 1 |  |
| F |  |  |  |

In the unmasked portion of the Code M sharp cut-off glass the transmission measured at 500 nm was reduced from 93.5 to 87.1% by the 240 hour exposure. For the soda-lime glass, and even the very thin Code C' mask, the transmission of the Code M glass was not reduced, however, the Code F and fused silica (Code G) masks permitted reductions to 87.7 and 87.2% respectively. The 50% transmission cut-offs before exposure for these glasses was at 337, 311, 231 and 165 nm for the soda-lime, Code C', Code F, and fused silica (Code G) glasses respectively. Only the soda-lime cut-off shifted from the exposure (to 339 nm). The unmasked Code M glass 50% transmission shifted only from 407 to 408 nm from this exposure, but the masked areas shifted less than 1 nm. None of the masking materials exhibited any reduced transmittance at 500 nm.

Figure 3:
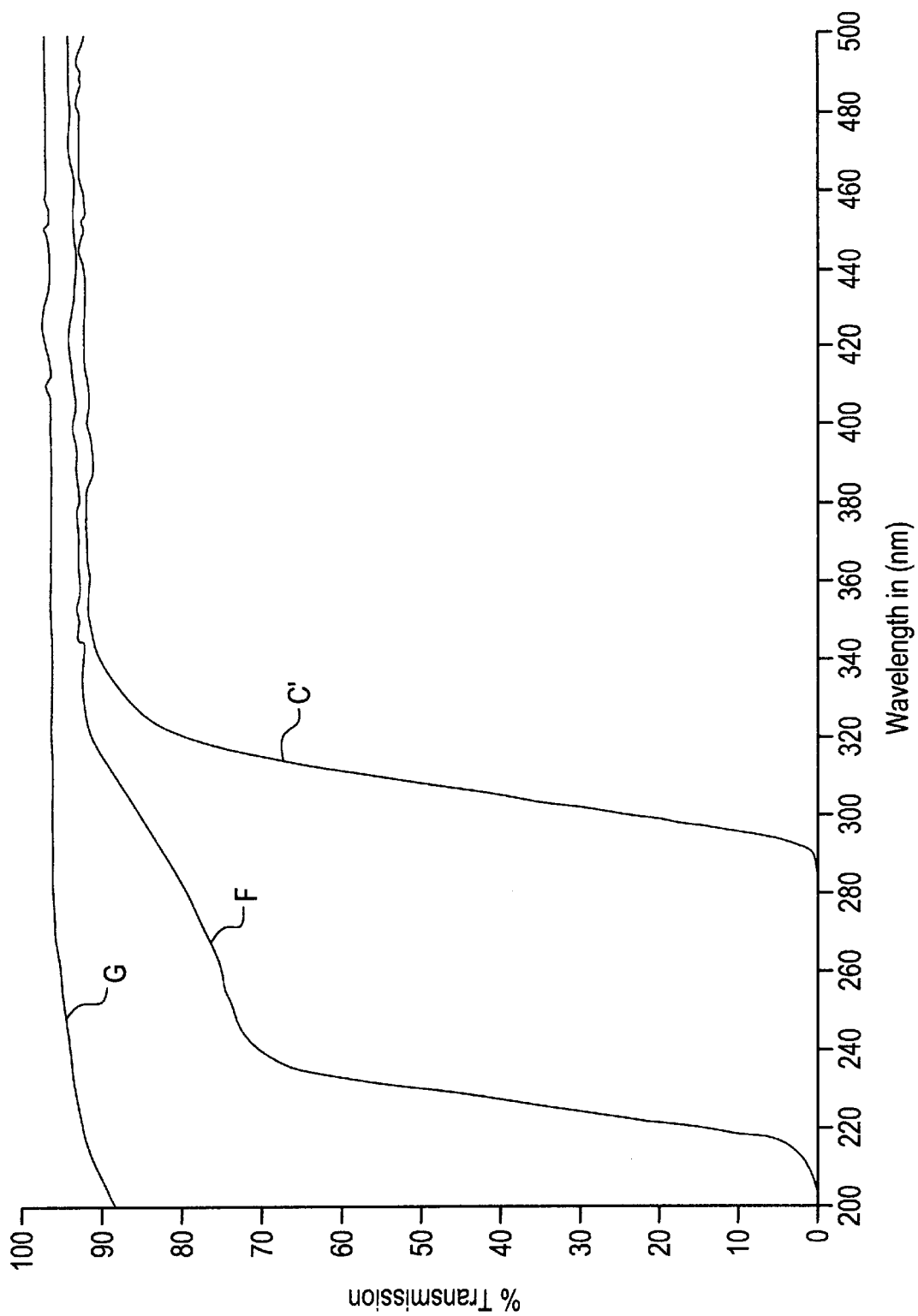
FIG. 3 is a spectral transmission graph comparing the spectral transmissions of several solarization resistant glasses with the transmission of fused silica.

As shown in FIG. 3, these masking glasses are completely UV light absorbing by 300, 298, 200 and 160 nm for the soda-lime, Code C', Code F, and fused silica (Code G) glasses respectively.

When these additional results including the fused silica (G) and Code F masks are considered it appears that materials that do not transmit light below 260 nm can stop the Code M sharp cut-off glass from any reduction in visible transmission or movement in its cut-off edge. On the other hand, materials that do not completely cut-off transmission until ~200 nm cannot prevent degradation of optical performance in the sharp UV cut-off glass.

A transmission of 85.4% was measured for the combination of 0.17 mm thick Code C' and the Code M sharp cut-off glass. Further exposures of unmasked Code M beyond 240 hours results in 500 nm transmissions below 80%. Thus masking combinations provide a continuously higher transmittance than non-protected sharp UV cut-off glass. The combination of these 2 glasses will therefore completely absorb UV light with a sharp cut-off of the light at the edge of the visible (~400 nm), while transmitting visible to near infrared light at high levels.

It is contemplated by the present invention that solarization resistant glasses that cut-off shorter wavelength UV can be used in combination with the ~400 nm sharp cut-off glass to provide a complete UV spectral blocking filter that is solarization resistant toward intense UV containing light sources while providing high visible transmission. As used herein with respect to solarization resistant glasses, "shorter wavelengths" means wavelengths less than about 200 nm, preferably, less than 260 nm, and more preferably less than about 300 nm.

Figure 4:
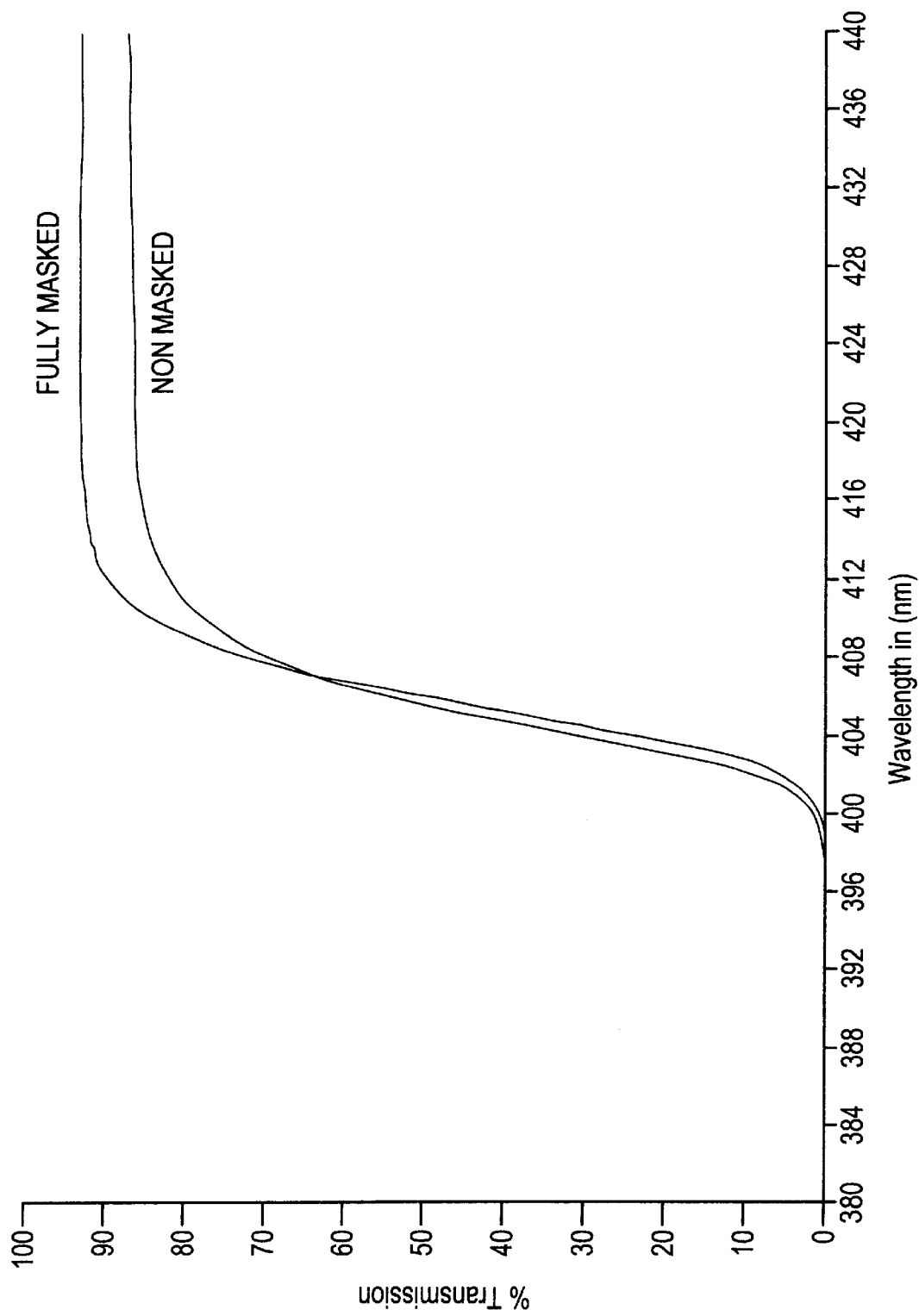
FIG. 4 is a spectrum comparing the transmission of a UV absorbing glass which has been fully masked with one of the inventive solarization-resistant glasses, with the spectral transmission graph of an unmasked UV absorbing glass, after exposure for 240 hours under 1000 watt Mercury Xenon lamp.

Other aspects of the invention are described below using FIGS. 3–6. FIG. 4 is a spectrum comparing the transmission of a UV absorbing glass which has been fully masked with one of the inventive solarization-resistant glasses, with the spectral transmission graph of an unmasked UV absorbing glass, after exposure for 240 hours under 1000 watt Mercury Xenon lamp. As shown, the transmission of the masked UV blocking glass was 92%, versus 85% for the unmasked glass.

Figure 5:
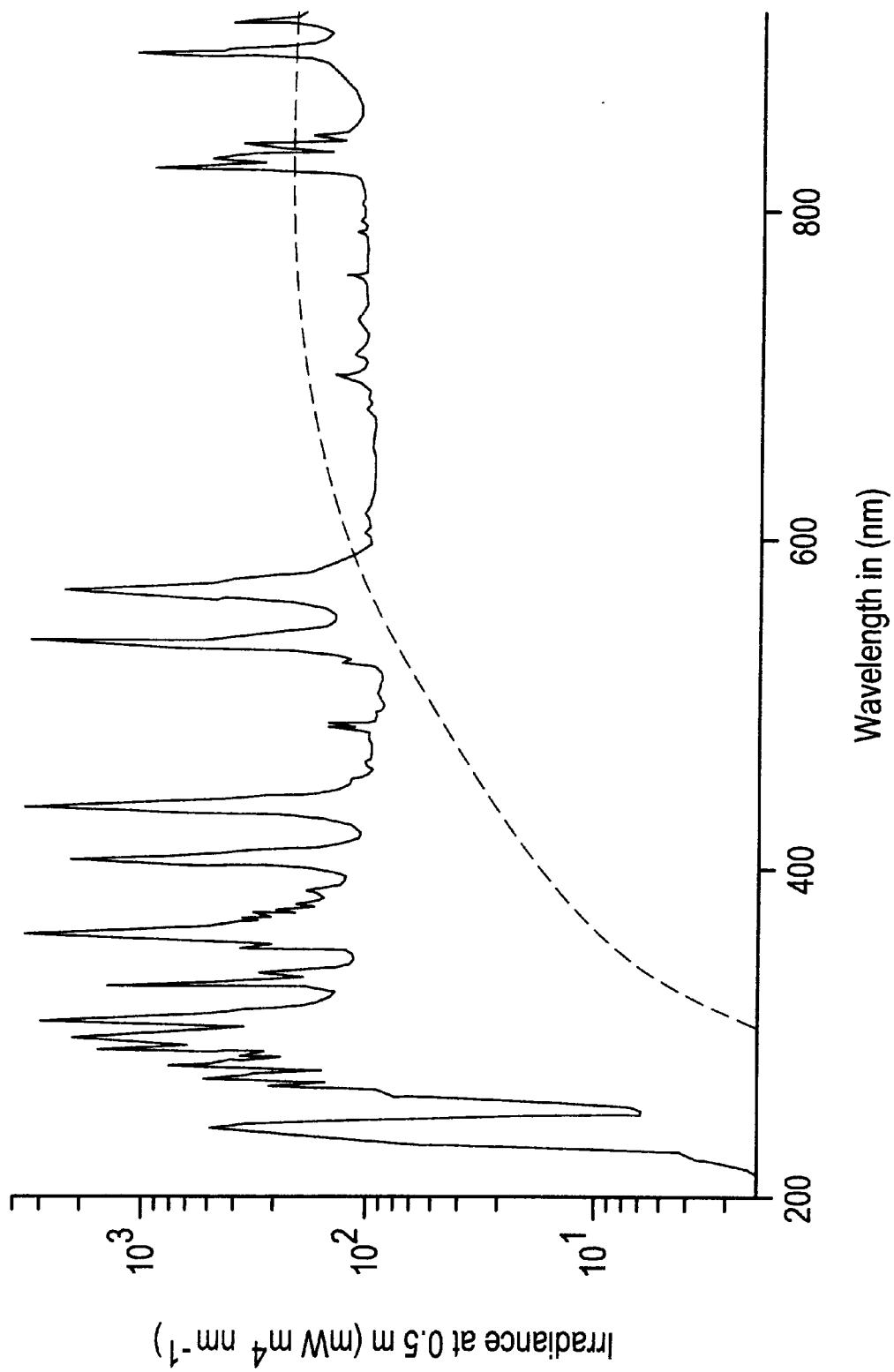
FIG. 5 is a spectral irradiance of a 1000 watt Hg(Xe)-ARC lamp.

FIG. 5 is a spectral irradiance of a 1000 watt Hg(Xe)-ARC lamp. FIG. 6 is a spectral irradiance of a 350 watt Hg(Xe)-ARC lamp. As shown, these lamps emit significant radiation in the wavelength range of 200–300 nm. FIG. 4 shows the effect of prolonged exposure of a UV cut-off glass to a Hg(Xe)-ARC lamp having similar spectral output to that shown in FIG. 6.

I have found that any UV absorbing glass can be combined with a solarization resistant glass to provide a substantially complete spectral blocking filter. A particularly useful example of a UV blocking glass is the non-photochromic $R_2O$—$B_2O_3$—$SiO_2$ glass of U.S. Pat. No. 5,322,819, which contains a precipitated cuprous or cuprous-cadmium halide crystal phase and has a sharp spectral cutoff at about 400 nm. The '819 glass composition consists essentially of in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20% $Na_2O$, 0–12% $K_2O$, the $Li_2O+Na_2O+K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$, and/or $Sb_2O_3$. The glass also contains 0–1.25% Cl, 0–1.0% Br, 0.25–2.0% Cl+Br and 0–2% F by weight, and has an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0% Cl+Br.

The present invention is particularly useful in applications where glass, such as UV blocking glass is to be used with artificial light sources, in particular halogen lamps. In general, the present invention is useful in any applications where the short wavelength blocking effects of the atmosphere is not available. Another such example is outer space applications.

In addition to the embodiments discussed above, it will be clear to persons skilled in the art that numerous modifications and changes can be made to the above invention without departing from its intended spirit and scope.

What is claimed is:

1. An optical device capable of absorbing ultraviolet radiation at wavelengths in the 400 nm region, while providing high transmission throughout the visible region, said optical device comprising a UV cut-off glass, and a solarization (or darkening) resistant glass.

2. The optical device of claim 1, wherein said UV cut-off glass contains a precipitated cuprous or cuprous-cadmium halide crystal phase and has a sharp spectral cutoff at about 400 nm, the glass composition consisting essentially of, in cation percent, 35–73% $SiO_2$, 15–45%, $B_2O_3$, 0–12% $Al_2O_3$ being less than 10% when the $SiO_2$ is over 55%, 0–12% $Li_2O$, 0–20% $Na_2O$, 0–12% $K_2O$, the $Li_2O+Na_2O+K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2$, at least 0.3 cation % $Cu_2O$ and 0.50–2.0% Cl+Br.

3. The optical device of claim 1, wherein said solarization resistant glass is a glass capable of transmitting wavelengths in the visible and near infra red regions.

4. The optical device of claim 3, wherein the solarization resistant glass is capable of blocking wavelengths in the 0 to 340 nm region.

5. The optical device of claim 3, wherein the solarization resistant glass begins total absorption of UV light in the wavelength range of 200 to 340 nm.

6. The optical device of claim 3, wherein the solarization resistant glass begins total absorption of UV light in the wavelength range of 260 to 300 nm.

7. A method of providing solarization resistance in a sharp UV transmission cut-off glass by protecting the UV cut-off glass using a solarization resistant glass.

8. The method of claim 7, wherein the UV cut-off glass is a non-photochromic glass.

9. The method of claim 8, wherein the UV cut-off glass contains a precipitated cuprous or cuprous-cadmium halide crystal phase and has a sharp spectral cutoff at about 400 nm, the glass composition consisting essentially of, in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20% $Na_2O$, 0–12% $K_2O$, the $Li_2O+Na_2O+K_2O$ being 4.75–20%, 0–5% CaO+BaO+SrO, 0.125–1.0% $Cu_2O$, 0.1–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0% Cl+Br.

10. The method of claim 7, wherein the solarization resistant glass blocks wavelengths below about 340 nm.

11. The method of claim 7, wherein the solarization resistant glass begins total absorption of UV light in the wavelength range of 200 to 340 nm.

12. The method of claim 11, wherein the solarization resistant glass begins total absorption of UV light in the wavelength range of 260 to 300 nm.

13. The method of claim 7, wherein the solarization resistant glass is selected from the group consisting of soda lime glass, fused silica, and borosilicate glasses.

14. The method of claim 7, wherein the solarization-resistant glass consists essentially in weight percent, of, 10–30% BaO, 5–20% $Al_2O_3$, 22–80% $B_2O_3$, and up to 55% $SiO_2$.

15. The method of claim 7, wherein the solarization-resistant glass consists essentially in weight percent of, at least 70% $SiO_2$, up to 3% $Al_2O_3$, $Na_2O$ and $B_2O_3$, such that the percentage of $B_2O_3$ to $Na_2O$ being not less than 2:1.

16. The method of claim 7, wherein the method of protecting the UV cut-off glass is selected from the group consisting of (a) enveloping the UV cut-off glass in a solarization resistant glass, and (b) placing a solarization resistant glass in the optical path, between a light source and the UV cut-off glass.

* * * * *

UNITED STATES PATENT AND TRADEMARK OFFICE
CERTIFICATE OF CORRECTION

PATENT NO. : 5,925,468
DATED : July 20, 1999
INVENTOR(S) : Ronald L. Stewart

It is certified that error appears in the above-identified patent and that said Letters Patent is hereby corrected as shown below:

| Col. | Line | |
|---|---|---|
| 5 | 60 | After "soda-lime", insert --(not shown in Figure 3)--. |

Signed and Sealed this

Fifteenth Day of August, 2000

Attest:

Q. TODD DICKINSON

*Attesting Officer*     *Director of Patents and Trademarks*